June 19, 1962  L. E. EATON  3,039,823
HYDRAULIC DUMPING MECHANISM FOR DUMP TRUCK
Filed June 24, 1960  2 Sheets-Sheet 1

FIG. I

INVENTOR:
LYLE E. EATON
BY John F. Schmidt

June 19, 1962 L. E. EATON 3,039,823
HYDRAULIC DUMPING MECHANISM FOR DUMP TRUCK
Filed June 24, 1960 2 Sheets-Sheet 2

INVENTOR:
LYLE E. EATON
BY John F. Schmidt

३,०३९,८२३
Patented June 19, 1962

3,039,823
HYDRAULIC DUMPING MECHANISM FOR DUMP TRUCK
Lyle E. Eaton, Pekin, Ill., assignor to LeTourneau-Westinghouse Company, Peoria, Ill., a corporation of Illinois
Filed June 24, 1960, Ser. No. 38,660
7 Claims. (Cl. 298—22)

This invention relates to a load-carrying vehicle of the dump truck type, especially to a dump truck having a closed hydraulic circuit to operate the body dumping mechanism.

Dump trucks which are designed to carry earth and other minerals often operate in exceedingly dusty conditions. This is especially true of off-highway vehicles such as trucks used in the earthmoving industry. Conventional hydraulic systems which are used to operate the dumping mechanism of such trucks are open to atmosphere, and the rising and falling liquid level in the hydraulic fluid reservoir breathes in and discharges large volumes of ambient air which is loaded with dirt and dust, with the result that the hydraulic fluid quickly becomes contaminated.

Furthermore, in order to reduce cycle time to a minimum, it is desirable that the rear dump body be emptied in as short a time as possible, and this of course means the delivery of hydraulic fluid under pressure at a high rate of speed to the dump jacks which tip the body for dumping purposes. Delivery of hydraulic fluid under pressure is generally accomplished by means of a hydraulic pump, and for efficient operation of the pump, cavitation in the suction line must be avoided. One way to minimize the likelihood of cavitation is to supercharge the pump suction.

It is accordingly an object of this invention to provide a load-carrying vehicle having a dump body, the body dumping mechanism including a closed hydraulic circuit in which the reservoir is sealed against direct exposure to the atmosphere, receiving only clean and dry air when the liquid level in the reservoir falls, and being adapted to discharge air quickly when necessary to prevent interference with rapid lowering of the dump body to its load-carrying position. It is another object of the invention to provide a load-carrying vehicle having a dump body provided with mechanism to move the body through its dumping cycle which utilizes a hydraulic circuit in which the pump suction is pressurized or supercharged in order to reduce the likelihood of cavitation in the pump.

Figure 1:
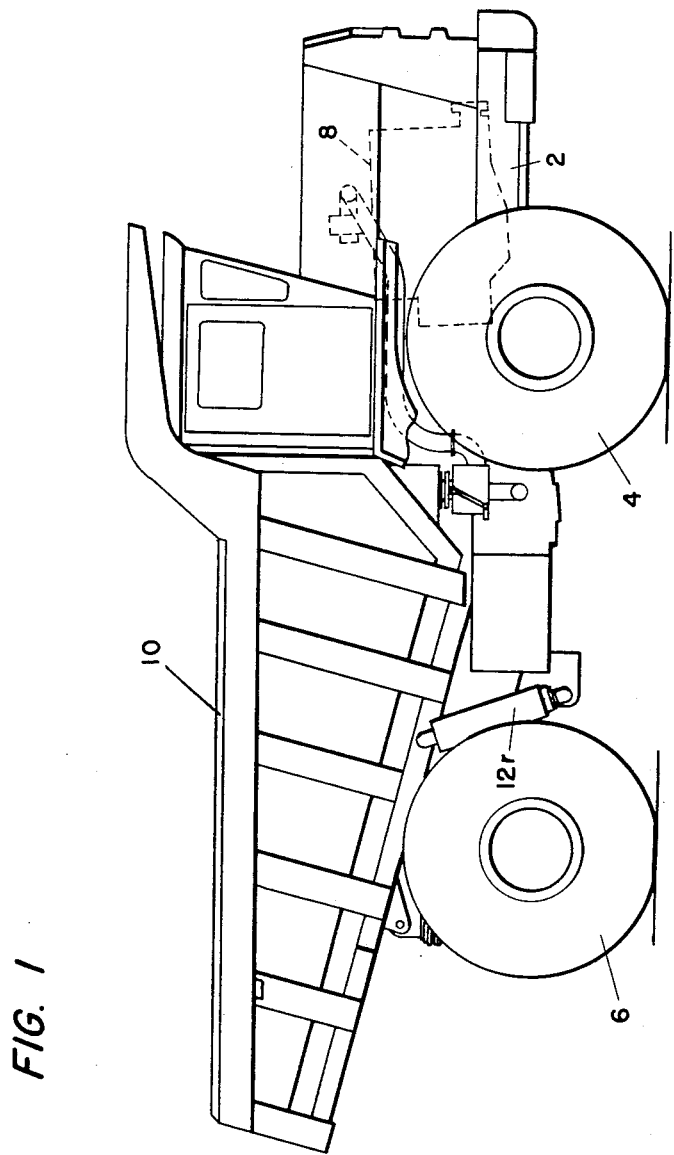
FIG. 1 is a side elevation view of a vehicle embodying the invention.

FIG. 1 shows a dump truck made according to this invention, the truck having a frame 2, wheels 4 and 6, a power plant 8, a dump body 10, and hydraulic motor means to operate the dump body 10, at least a portion of the hydraulic motor means being shown at 12r. In actual practice, the hydraulic motor means used to effect movement of the dump body 10 from its load-carrying position shown in FIG. 1 to a dumping position is a pair of hydraulic jacks, one on each side of the vehicle. In FIG. 1, the jack at the right side of the vehicle is shown at 12r.

Figure 2:
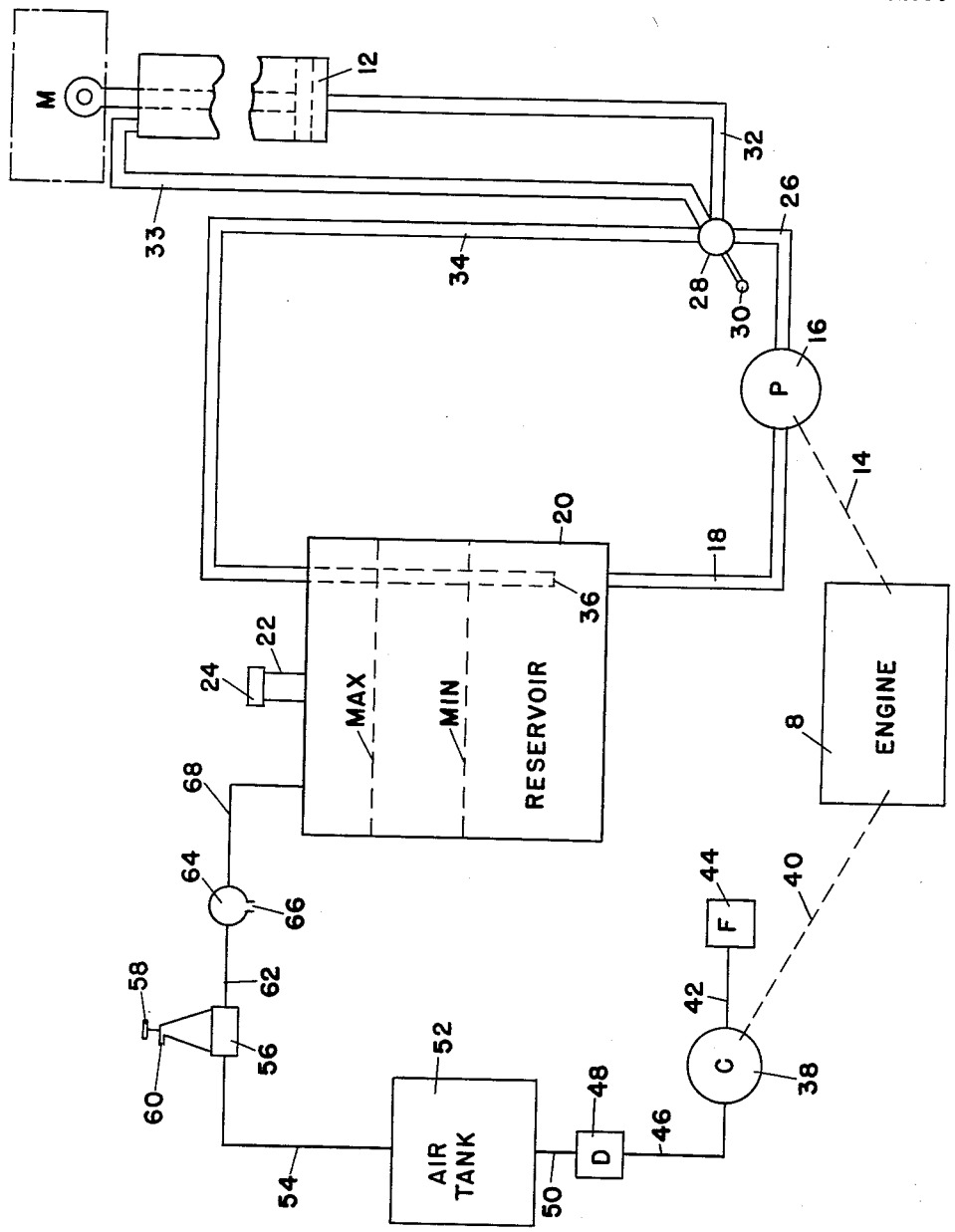
FIG. 2 is a diagrammatic view showing a hydraulic circuit according to this invention and means for supplying elastic fluid to the reservoir of the hydraulic circuit.

Referring now to FIG. 2 for a discussion in detail of the closed hydraulic system, it will be noted that power plant 8 is connected by any suitable conventional means, indicated schematically at 14, to drive a hydraulic pump 16. Pump 16 is connected by conduit means 18 to receive fluid from a fluid reservoir 20. Reservoir 20 is provided with an access pipe 22 which is capped as shown at 24 to seal the reservoir against direct access to the atmosphere. The hydraulic motor means shown at 12 in FIG. 2 is intended to symbolize the totality of hydraulic motor means in the circuit. In the embodiment shown in the drawings, hydraulic motor means 12, FIG. 2, represents two hydraulic jacks of the type shown at 12r in FIG. 1. Also, hydraulic motor means 12, FIG. 2, is shown as being connected to lift a mass M, mass M representing the resistance offered by the body 10 of FIG. 1. Body 10 is of course dumped against gravity, so that the mass M in FIG. 2 represents that portion of the resistance to movement which is caused by the force of gravity acting upon the empty body and the load carried thereby. The resistance to body movement caused by friction, etc., is treated as negligible for the purposes of this case.

Means are provided to connect pump 16, motor means 12, and reservoir 20. These means include a conduit 26 connected to the pump pressure port and to a control valve 28 shown as provided with a control handle 30. Valve 28 is provided with two pressure ports and a return port, the pressure ports being connected with motor means 12 by conduits 32 and 33, and the return port of the valve being connected with reservoir 20 by a conduit 34. As will be understood by those skilled in the art, the end portion 36 of conduit 34 is preferably disposed in reservoir 20 below the normal minimum liquid level MIN.

Even as the minimum liquid level is shown at MIN in FIG. 2, the maximum liquid level is shown at MAX. The volume change which the hydraulic fluid in the reservoir undergoes between the two levels MIN and MAX is the full hydraulic fluid capacity of hydraulic motor means 12 when motor means 12 is a single acting jack, and when motor means 12 is double acting, is the difference in capacity of the motor means for the two strokes—i.e., is equal to the volume of that portion of the piston rod which occupies hydraulic fluid space when motor means 12 is completely collapsed. It will be understood by those skilled in the art that the variations in the quantity of hydraulic fluid held by reservoir 20 will necessarily be within the volume thus represented. In other words, the quantity of hydraulic fluid in the reservoir varies between a maximum and a minimum, and the difference between these quantities will normally not exceed the maximum capacity of motor means 12. Conversely, the elastic fluid space above the liquid level varies between a minimum and a maximum, and of course the variation is normally no greater than the total hydraulic fluid capacity of motor means 12. It will of course also be understood that, while the variation cannot normally be greater than the net volume capacity of motor means 12, it may on occasion be less. This would be the case, for example, if body 10 were not raised to its maximum dumping position.

Because it is desirable that ambient air, which is dirty, not leak into reservoir 20, the pressure in reservoir 20 is normally maintained at a value greater than atmospheric. However, inasmuch as the pressure in reservoir 20 opposes lowering of the dump body to its load-carrying position, it is also desirable that the pressure in reservoir 20 not be great enough to interfere with rapid lowering of body 10 to its normal load-carrying position.

Within the limits of the foregoing requirements, means are provided to maintain a pressure of elastic fluid in reservoir 20 within lower and upper limits. In the embodiment shown, this is accomplished by an air compressor indicated schematically at 38 connected to be driven by engine 8 through any suitable drive shown schematically at 40. It will of course be understood that any suitable elastic fluid may be used. However, because air is universally available, air is a preferred elastic fluid. In the embodiment shown, compressor 38 is shown connected by a conduit 42 with a filter 44. Compressor 38 discharges elastic fluid under pressure through a conduit 46 to a dehumidifier 48. A conduit 50 connects dehumidifier 48 with an air tank 52.

The system described in the preceding paragraph is reasonably conventional and may be provided by any person skilled in the art from a large variety of commercially available components. This system constitutes a source of elastic fluid under pressure. A connection is provided between the source of elastic fluid and reservoir 20. In the embodiment shown, the connection comprises a conduit 54 connecting tank 52 with a pressure regulator 56. Regulator 56 is provided with a regulating handle 58 and a bleed port 60. A conduit 62 connects pressure regulator 56 with a quick release valve 64 which is provided with an outlet 66 to the atmosphere. Quick release valve 64 connects with reservoir 20 by means of a conduit 68.

Operation

Hydraulic valve 28, provided with handle 30 as aforesaid, may be any one of a number of suitable commercially available valves. In a preferred embodiment, valve 28 has four operating positions: raise, hold, float, and lower. In the "raise" position, the inlet port of the valve is connected with the port which communicates with conduit 32, and the port which communicates with conduit 33 is connected with the return port. In the "hold" position, fluid is trapped by closure of the two pressure ports; in this position of the control valve, the valve inlet port is connected with the return port. In the "float" position, all of the valve ports are open. In the "lower" position, the port which communicates with conduit 33 is connected with the inlet port, and the port which communicates with conduit 32 is connected with the return port.

If control handle 30 is now moved to the "raise" position, hydraulic fluid is pumped into motor means 12 by way of conduit 32 and hydraulic fluid is discharged from motor means 12 by means of conduit 33. Even though fluid is being returned to the reservoir at the same time that fluid is being taken from the reservoir, because of the volume of the connecting rod, there is a net loss of hydraulic fluid in reservoir 20 and a corresponding net increase in the space available to the elastic fluid above the liquid level. As the liquid level falls, the elastic fluid above the liquid expands with a corresponding decrease in elastic fluid pressure. If the elastic fluid pressure drops below a predetermined minimum (9 p.s.i.g. has been used successfully), then additional elastic fluid is admitted to the reservoir from air tank 52 by way of conduit 54, pressure regulator 56, conduit 62, quick release valve 64, and conduit 68. The result is that there is at all times during the falling of the liquid level a pressure in reservoir 20 which is greater than atmospheric.

When the dump body 10 is lowered, fluid under pressure is supplied to the rod end of the motor means 12 by way of conduit 33 and is discharged from the head end of motor means 12 by way of conduit 32. During this part of the operating cycle, there is a net increase of fluid in reservoir 20 and a corresponding net decrease in the space available to the elastic fluid above the liquid level. Consequently, the elastic fluid is compressed. Under the increased pressure, elastic fluid is discharged to atmosphere through port 60 of pressure regulator 56 by way of conduit 68, quick release valve 64, and conduit 62. It is desirable that the body 10 be lowered quickly, and to facilitate rapid lowering of the body, the back pressure on conduit 32 must not be excessive. If port 60 of regulator 56 cannot discharge elastic fluid fast enough to prevent a buildup of elastic fluid pressure beyond a predetermined maximum (15 p.s.i.g. has been found to give satisfactory results), then quick release valve 64 opens and permits discharge of elastic fluid to the atmosphere by way of its port 66.

It will be seen from the foregoing that reservoir 20 is permitted to have a rising and falling liquid level without the disadvantages of introducing contaminated air into reservoir 20. The pressurized elastic fluid space amounts in effect to supercharging of the pump, which has the added advantages of increasing the pump output, minimizing the likelihood of cavitation of the pump, and making higher pump speeds feasible. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A hydraulic power transmission device comprising: a reservoir adapted to hold a volume of hydraulic fluid variable between a maximum and a minimum and providing an elastic fluid space which is variable within the volume determined by the difference between the maximum hydraulic fluid volume and the minimum hydraulic fluid volume; a pump connected to receive fluid from the reservoir; hydraulic motor means adapted alternately to receive and discharge hydraulic fluid in quantities not to exceed said difference; means connecting the pump, the motor means, and the reservoir and including a valve; and means to maintain elastic fluid in the elastic fluid space at a pressure above atmospheric and variable between a predetermined maximum and a predetermined minimum.

2. A hydraulic power transmission device comprising: a reservoir adapted to hold a volume of hydraulic fluid variable between a maximum and a minimum and providing an elastic fluid space which is variable within the volume determined by the difference between the maximum hydraulic fluid volume and the minimum hydraulic fluid volume; a pump connected to receive fluid from the reservoir; hydraulic motor means adapted alternately to reecive and discharge hydraulic fluid in quantities not to exceed said difference; means connecting the pump, the motor means, and the reservoir and including a valve; a source of elastic fluid under pressure greater than atmospheric presusre; and a connection from said source to the elastic fluid space of the reservoir and including a pressure regulator and a relief valve, the relief valve being disposed in the connection between the pressure regulator and the reservoir.

3. A hydraulic power transmission device comprising: a reservoir adapted to hold a volume of hydraulic fluid variable between a maximum and a minimum and providing an elastic fluid space which is variable within the volume determined by the difference between the maximum hydraulic fluid volume and the minimum hydraulic fluid volume; a pump connected to receive fluid from the reservoir; hydraulic motor means adapted alternately to receive and discharge hydraulic fluid in quantities not to exceed said difference; means connecting the pump, the motor means, and the reservoir and including a valve; a source of elastic fluid under pressure greater than atmospheric pressure; means, including said source, to add elastic fluid at a pressure above atmospheric to the elastic fluid space when the pressure in said space falls to a predetermined minimum above atmospheric; and means to release elastic fluid from the space when the pressure in said space rises to a predetermined maximum.

4. In a vehicle, a power plant, a load-carrying body movably mounted to permit dumping of the load, hydraulic motor means connected to effect movement of the body from its load-carrying position to a dumping position and adapted during such movement to receive a volume of hydraulic fluid not to exceed a predetermined maximum and adapted to discharge hydraulic fluid during movement from a dumping position to said load-carrying position, a reservoir for hydraulic fluid and adapted to contain hydraulic fluid in amounts which are variable within the limits of said predetermined maximum volume and providing an elastic fluid space which is variable within the aforesaid same limits, a hydraulic pump driven by the power plant and connected to receive hydraulic fluid from the reservoir, a source of elastic fluid under pressure greater than atmospheric pressure, means including said source to supply elastic fluid at a pressure above atmospheric to the elastic fluid space of the reservoir whenever the pressure in said space falls below a predetermined minimum above atmospheric, means to release elastic fluid from the space whenever the pressure in the space exceeds a predetermined maximum, and means connecting the pump with the motor means and the reservoir.

5. In a vehicle, a power plant, a load-carrying body movably mounted to permit dumping of the load, hydraulic motor means connected to effect movement of the body from its load-carrying position to a dumping position and adapted during such movement to receive a volume of hydraulic fluid not to exceed a predetermined maximum and adapted to discharge hydraulic fluid during movement from a dumping position to said load-carrying position, a reservoir for hydraulic fluid and adapted to contain hydraulic fluid in amounts which are variable within the limits of said predetermined maximum volume and providing an elastic fluid space which is variable within the aforesaid same limits, a hydraulic pump driven by the power plant and connected to receive hydraulic fluid from the reservoir, means connecting the pump with the motor means and the reservoir, a source of elastic fluid under pressure greater than atmospheric pressure including a compressor connected to be driven by the power plant, and means connecting the compressor with the elastic fluid space in the reservoir.

6. In a vehicle, a power plant, a load-carrying body movably mounted to permit dumping of the load, hydraulic motor means connected to effect movement of the body form its load-carrying position to a dumping position and adapted during such movement to receive a volume of hydraulic fluid not to exceed a predetermined maximum and adapted to discharge hydraulic fluid during movement from a dumping position to said load-carrying position, a reservoir for hydraulic fluid and adapted to contain hydraulic fluid in amounts which are variable within the limits of said predetermined maximum volume and providing an elastic fluid space which is variable within the aforesaid same limits, a hydraulic pump driven by the power plant and connected to receive hydraulic fluid from the reservoir, means connecting the pump with the motor means and the reservoir, a source of elastic fluid under pressure greater than atmospheric pressure including a compressor connected to be driven by the power plant, means connecting the compressor with the elastic fluid space in the reservoir and including a pressure regulator to admit fluid under pressure to said space whenever the pressure in the space falls below a predetermined minmium, and means to release fluid from the space whenever the pressure in the space exceeds a predetermined maximum.

7. A vehicle as in claim 6, in which the fluid release means is a valve in the means connecting the compressor with the elastic fluid space.

References Cited in the file of this patent
UNITED STATES PATENTS
2,764,950    Finnell _____ Oct. 2, 1956

FOREIGN PATENTS
328,304    Switzerland _____ Feb. 28, 1958